Figure 1:
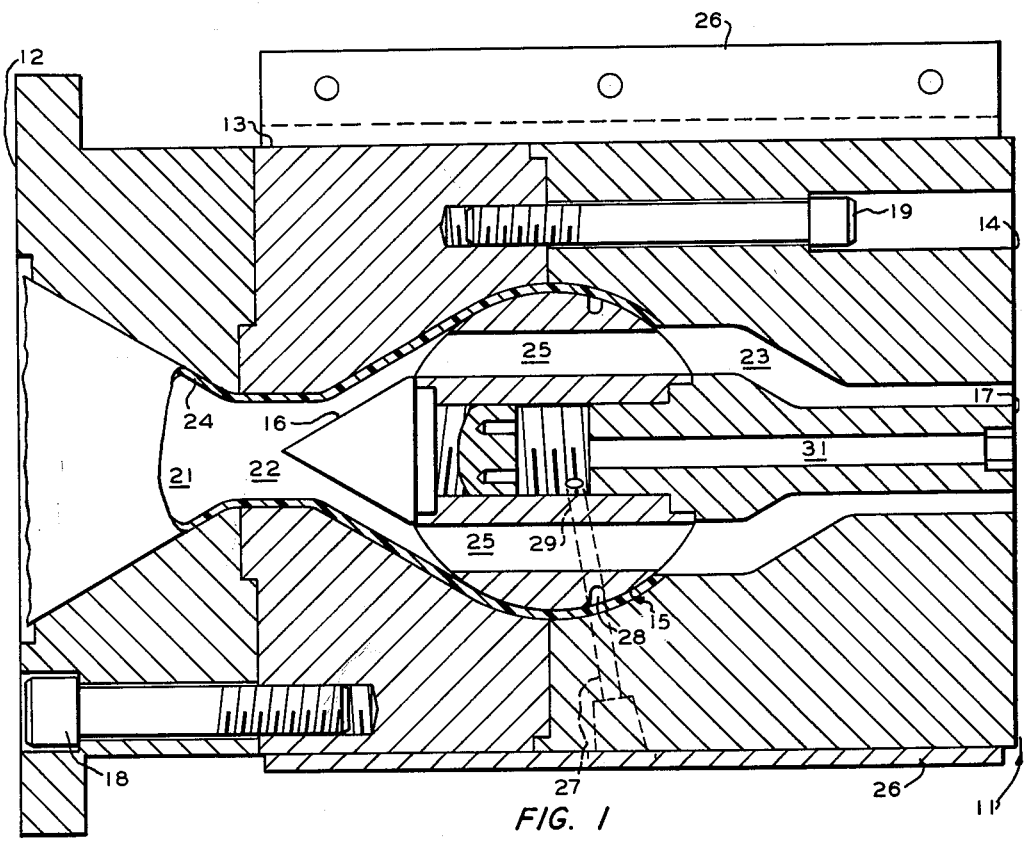

Nov. 26, 1963 — T. E. BRANSCUM — 3,111,714
SELF-CENTERING EXTRUSION DIE
Filed May 14, 1962

INVENTOR.
T. E. BRANSCUM
BY
*Young and Quigg*
ATTORNEYS

United States Patent Office 3,111,714
Patented Nov. 26, 1963

3,111,714
SELF-CENTERING EXTRUSION DIE
Tony E. Branscum, Bartlesville, Okla., assignor to Phillips Petroleum Company, a corporation of Delaware
Filed May 14, 1962, Ser. No. 194,479
9 Claims. (Cl. 18—14)

This invention relates to a self-centering extrusion die and a method for extruding tubular products.

In the extrusion of tubular products from thermoplastic material, difficulties are often encountered in maintaining good wall uniformity around the circumference of the extrusion. Thousands of pounds of material and many man and machine hours are lost each year in tubular extrusion operations because of the difficulty in maintaining uniform walls in the extruder product. This same problem is encountered in blow molding since a parison tube must be extruded in order to obtain the blank from which the finished shape is to be blown.

In accordance with the invention there is provided a relatively simple die which is completely self-centering to provide for the automatic adjustment of the thickness of the walls of the extrudate comprising a mandrel mounted on the downstream end of a mandrel swivel and a compensating choke mounted on the upstream end of said mandrel swivel. Thus, should the mandrel move away from the exact center of the die, the mandrel swivel will act as a pivot and the compensating choke will move in the opposite direction, thus correcting the flow which will cause the mandrel to return to the center. For example, if the mandrel should move downwardly, thus causing the extrudate to be thick at the top, the compensating choke will move upwardly thus choking the flow at the top and increasing the flow at the bottom, thus pushing the mandrel back up to the center position. Thus a self-centering extrusion die in accordance with the invention can be utilized for the production of pipe, tubing, blown film, blow molding and the like. A self-centering extrusion die in accordance with the invention can be utilized with any suitable type of extruder such as a screw, ram, or impulse extruder. Also a self-centering extrusion die in accordance with the invention can be utilized in the extrusion of various shapes, such as circular, oval, rectangular, and the like.

Accordingly it is an object of the invention to provide method and apparatus for producing tubular extrusions having good wall uniformity around the circumference of the extrusion. Another object of the invention is to provide blanks for blow molding having uniform wall thickness. Another object of the invention is to produce extrusion products having uniform wall thickness.

Other objects, aspects and advantages of the invention will be apparent from a study of the disclosure, the drawing, and the appended claims.

Figure 2:
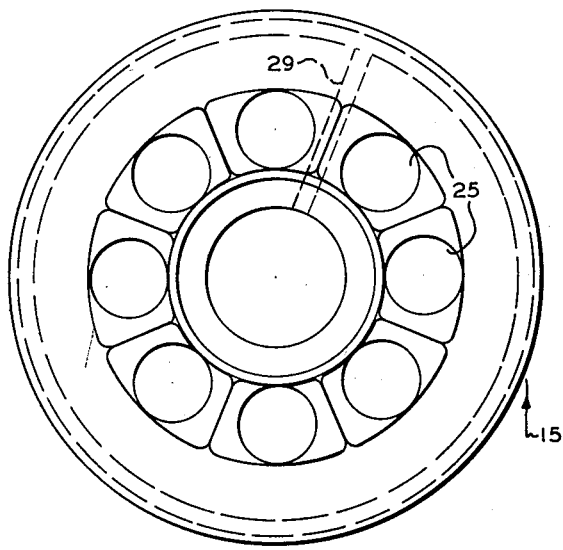

In the drawings FIGURE 1 is a side elevational view of a self-centering die in accordance with the invention, and FIGURE 2 is an end view of the ball spider of FIGURE 1.

Referring now to the drawing and to FIGURE 1 in particular there is shown an extrusion die 11 comprising die base 12, valve section 13, forming section 14, mandrel swivel 15, valve element 16, and mandrel 17. Die base 12 and valve section 13 can be joined together by any suitable means, such as one or more screws 18 and valve section 13 and forming section 14 can be joined together by any suitable means such as one or more screws 19, to form a continuous passageway comprising chambers 21, 22, and 23. Thermoplastic material can be introduced into chamber 21 by an extruder (not shown). Chambers 22 and 23 are shaped to receive the mandrel swivel 15 and permit the mandrel swivel 15 to rotate freely about its geometrical center. Chambers 22 and 23 can be lined with a non-corrodible lining 24 of any suitable material, such as Teflon. The utilization of suitable lubricating material, such as Teflon in contact with mandrel swivel 15 reduces the resistance against rotation of mandrel swivel 15 without requiring a liquid lubricant which could contaminate the thermoplastic material being extruded. Mandrel swivel 15 contains a plurality of passages 25 communicating between chambers 22 and 23. Valve element 16 and mandrel 17 are joined to the upstream and downstream ends, respectively, of mandrel swivel 15 by any suitable means, such as screw threads or bayonet joints. Valve element 16 can be any suitable shape, such as conical, while that portion of chamber 22 adjacent valve element 16 can be any suitable corresponding shape, such as a frustum. A heating element 26 is mounted around and in heat exchanging relationship with valve section 13 and forming section 14. Heating element 26 can be any suitable device such as an electric heating element or an indirect fluid heat exchanger.

Air for maintaining pressure inside the extruded tubing is passed through passageway 27 in forming section 14 and into circumferential groove 28 in mandrel swivel 15 and then through passageway 29 into passageway 31 in mandrel 17. The air can be supplied at a rate sufficient to prevent the walls of the extruded tubing from collapsing or at a rate sufficient to cause the extruded tubing to expand, such as in blow molding.

Referring now to FIGURE 2 there is shown an end view of mandrel swivel 15 containing eight passageways 25 having the entrances and exits of adjacent passageways blended together to provide streamline flow of thermoplastic material therethrough. While mandrel swivel 15 has been illustrated as having eight cylindrical passageways 25, any desired number of passageways of any desired shape can be utilized. While mandrel swivel 15 has been illustrated as a ball spider, any other suitable shape, such as a disk having a curved edge, can be utilized.

In the operation of a self-centering extrusion die in accordance with the invention, the freely rotatable mandrel swivel 15 and the valve element 16 cooperate to maintain the mandrel in a centered position. If the mandrel 17 should move away from the exact center of the die for any reason, mandrel swivel 15 acts as a pivot point to move valve element 16 in a direction opposite to the movement of mandrel 17, thus decreasing the flow of material to that side of the mandrel which has moved further away from the wall of chamber 23 and causing the mandrel to return to the centered position. For example, if the mandrel 17 should move downwardly thus causing the extrudate to be thick at the top, valve element 16 will move upwardly thus choking the flow of material at the top and increasing the flow of material at the bottom, thus pushing the mandrel 17 back up to its centered position.

Reasonable variation and modification are possible within the scope of the foregoing disclosure, the drawing, and the appended claims to the invention.

I claim:
1. A self-centering tubular extrusion die comprising a die base having a first chamber therein, a valve section having a second chamber therein, a forming section having a third chamber therein, means for joining said die base to one side of said valve section and for joining said forming section to the opposite side of said valve section so that said first, second and third chambers form a continuous first passageway, a mandrel swivel positioned in said first passageway in a freely rotatable manner, said mandrel swivel having a plurality of passageways there- through, a mandrel positioned in said third chamber and secured to the downstream side of said mandrel swivel, and a valve element positioned in second chamber and secured to the upstream side of said mandrel swivel and adapted to cooperate with said valve section to cause a choking of the flow of thermoplastic material therebetween on one side and an increase of the flow of thermoplastic material therebetween on the side opposite to said one side.

2. Apparatus in accordance with claim 1 further comprising a circumferential groove in said mandrel swivel, a second passageway in said forming section communicating between said groove and the exterior of said die, a third passageway axially positioned in said mandrel and extending therethrough, a fourth passageway in said mandrel swivel communicating between said groove and said third passageway whereby a fluid can be passed through said second passageway, said groove, said fourth passageway and said third passageway into the interior of the extrudate to maintain a desired pressure therein.

3. Apparatus in accordance with claim 1 further comprising a lubricating thermoplastic material positioned between said mandrel swivel and the walls of said first passageway to reduce the resistance against the rotatability of said mandrel swivel.

4. Apparatus in accordance with claim 1 further comprising heat exchanging means in thermal transferring relationship with said valve section and said forming section.

5. Apparatus in accordance with claim 1 wherein said mandrel swivel is a ball spider.

6. Apparatus in accordance with claim 1 wherein the portion of said second chamber which is adjacent said valve element is in the form of a frustum and said valve element is conically shaped.

7. A self-centering extrusion die comprising a die housing having a first passageway extending therethrough, a mandrel swivel, means for positioning said mandrel swivel in said first passageway in a freely rotatable manner, a mandrel positioned in said first passageway and secured to the downstream side of said mandrel swivel, a valve element positioned in said first passageway and secured to the upstream side of said mandrel swivel whereby a displacement of the mandrel from its centered position causes said valve element to move in the opposite direction thus reducing the flow of material to the side of the mandrel which has moved further away from the wall of said first passageway and increasing the flow of material to the side of the mandrel which has moved toward the wall of said first passageway.

8. Apparatus in accordance with claim 7 further comprising a second passageway axially extending through said mandrel and means for passing a fluid through said second passageway.

9. Apparatus in accordance with claim 7 further comprising a lubricating thermoplastic material positioned between said mandrel swivel and said die body.

References Cited in the file of this patent
UNITED STATES PATENTS

| | | |
|---|---|---|
| 2,633,602 | Sverdrup | Apr. 7, 1953 |
| 2,874,411 | Bergrust | Feb. 24, 1959 |